United States Patent [19]

Pfannenschmidt

[11] Patent Number: 5,577,708

[45] Date of Patent: Nov. 26, 1996

[54] BALL VALVE

[75] Inventor: Erhard Pfannenschmidt, Norderstedt, Germany

[73] Assignee: James Wang, Taipei, Taiwan

[21] Appl. No.: 506,820

[22] Filed: Jul. 25, 1995

[51] Int. Cl.⁶ .................................................. F16K 5/06
[52] U.S. Cl. ............................ 251/315.11; 251/317.01
[58] Field of Search ............................ 251/312, 316, 251/317, 317.01, 315.11

[56] References Cited

U.S. PATENT DOCUMENTS

| Re. 26,998 | 12/1970 | Brown | 251/315.11 |
| 2,233,074 | 2/1941 | Corbin | 251/312 X |
| 4,273,152 | 6/1981 | Freeman | 251/317 X |
| 4,548,385 | 10/1985 | Barbuto | 251/317 X |

Primary Examiner—John C. Fox
Attorney, Agent, or Firm—Poms, Smith, Lande & Rose

[57] ABSTRACT

A ball valve includes a housing which has at least two connector holes defined therein which communicate to a hollow space in which a plug is rotatably disposed, the plug has at least two recesses defined therein and each of the recesses has a sealing element disposed therein for covering the corresponding connector hole when rotating the plug to a closed position, the plug has a hole defined therein which is in alignment with the connector holes of the housing when the valve is in an open state, the plug is actuated by a lever which is connected to a selector shaft extending from the plug by disposing a nut to the selector shaft.

9 Claims, 3 Drawing Sheets

BALL VALVE

BACKGROUND OF THE INVENTION

1. Field of Invention

The present invention relates to a ball valve and more particularly, to a ball valve having a hemispherical plug in which a suitable hole is defined for communicating with connector holes defined in the casing and the plug having sealing elements disposed thereto for sealing the connector holes when rotating the plug.

2. Related Prior Art

In the case of so-called "top entry" ball valves, the housing is sealed by means of a flange and a plurality of screws for holding the plug of the cock, in order to create an opening for installing the plug of the cock which also enables the plug of the cock and seals to be removed after such a ball valve has been welded in as a part of a duct.

A ball valve has come to light from DE 39 14 327 which has a cover on the housing. The housing contains two lockable conduits running in parallel which are assigned a rotating, hemispherical plug running on bearings in the housing. This closes the housing with the plug by means of the cover for the plug for guiding the actuating mechanism. Sealing rings are fitted coaxially in extended recesses of the conduits; these are in the immediate area of the holes in the ball.

A ball valve has come to light from G 94 08 156 in which a single-piece sealer which forms a seal by supporting itself on the walls of the hollow space in the housing and which has a hemispherical recess for the plug of the cock as well as coaxial holes with coaxial connector holes. The sealer is made from a suitable material and completely covers the hollow space in the valve housing, so that the medium traveling through the valve cannot be held back in crevices or other dead spaces. This is further improved by the fact that the cover helps to press the sealer tightly into the hollow space by means of preliminary tension at the plug of the cock. This prevents the product from getting into the hollow space between the cover and plug, for example. A ball valve with this structure functions satisfactorily. However if the seal becomes damaged, it is necessary to replace the complete cladding formed by the sealer. This involves not inconsiderable expense, particularly if the sealer is to be made from high-grade material.

For this reason the purpose of the invention is to provide a weldable ball valve which enables the plug of the cock and the sealant to be installed and removed, which has no crevices or dead spaces where the product can stick, and which can be manufactured with the lowest possible expenditure on production and materials.

SUMMARY OF THE INVENTION

The present invention provides a ball valve which includes a housing in which has at least two connector holes defined which communicate to a hollow space in which a plug is rotatably disposed, the plug has at least two recesses defined therein and each of the recesses has a sealing element disposed therein for covering the corresponding connector hole when rotating the plug to a closed state, a hole is defined in the plug and is in alignment with the connector holes when the valve is in an open state, the plug is actuated by a lever which is connected to a selector shaft extending from the plug by disposing a nut to the selector shaft.

It is an object of the present invention to provide a ball valve which has a one-piece housing which allows it to be welded directly into the pipeline.

It is another object of the present invention to provide a ball valve which has no vacant space therein.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
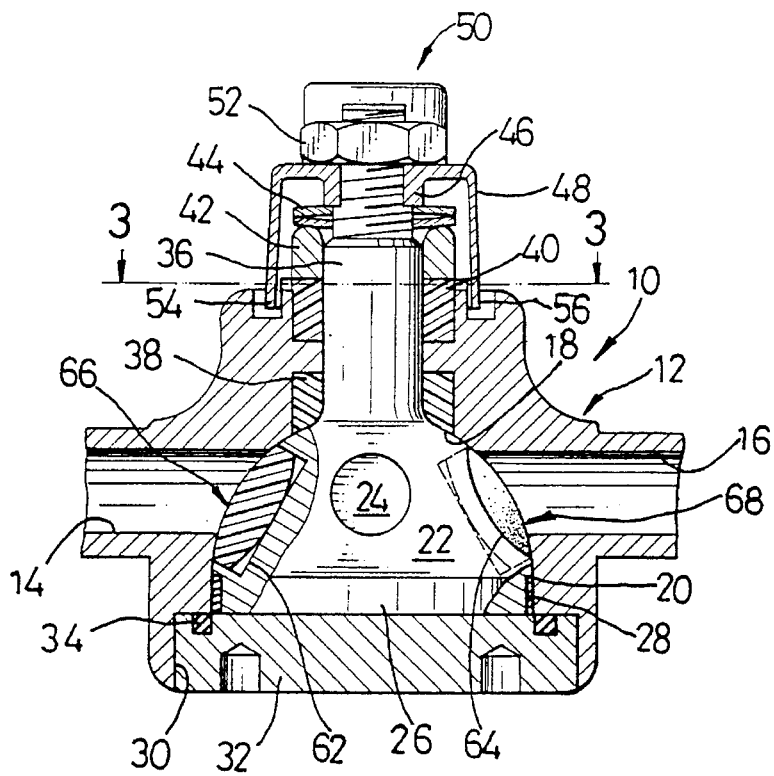
FIG. 1 is a side elevational view, partly in section, of a ball valve in accordance with the present invention.
Figure 2:
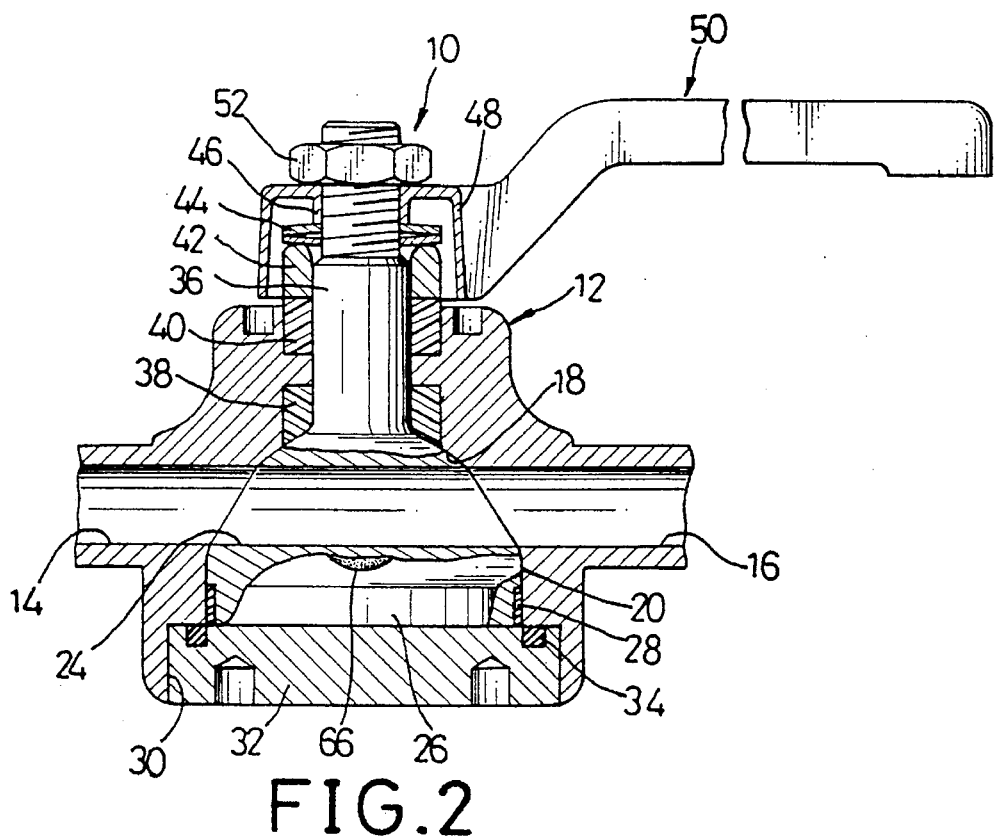
FIG. 2 is a side elevational view, partly in section, of the ball valve accordance with the present invention which is in open state.
Figure 3:
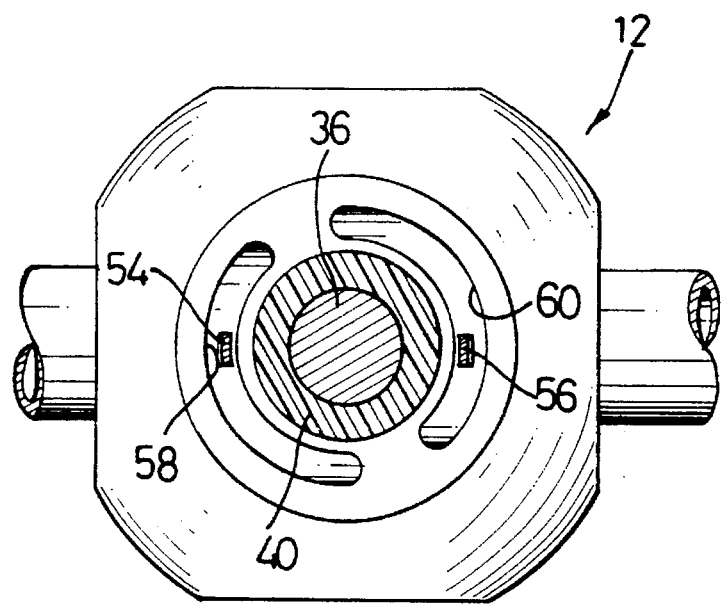
FIG. 3 is a top plane view of a casing of the ball valve in accordance with the present invention.

Referring to the drawings and initially to FIGS. 1 through 3, a ball valve 10 in accordance with the present invention generally includes a single-piece housing 12 which has two coaxial connector holes 14, 16 defined therein and opening out into a hollow space which includes a hollow section 18 and a cylindrical hollow section 20. A hemispherical plug 22 is rotatably received in the hollow space of the housing 12 and has a hole 24 defined therein. When ball valve 10 is open, the hole 24 is aligned with connector holes 14, 16 (FIG. 2). When ball valve 10 is closed, the hole 24 is offset from holes 14 and 15 by 90 degrees.

The hemispherical plug 22 has a cylindrical section 26 which fits into the cylindrical hollow section 20 of the housing 12. A bush 28 made from a suitable sealing material can be pushed onto the cylindrical section 26 of the spherical plug 22.

A cover 32 is screwed into an opening 30 which is defined in an underside of the housing 12 such that the flat underside of cylindrical section 26 of the hemispherical plug 22 is flush with the cover 32. The cover 32 contains an 0 ring 34 in a corresponding groove for sealing off cover 32 from housing 12.

A selector shaft 36 integrally extends from a top of the hemispherical plug 22 and extends outwards through an appropriate passage in housing 12. A first ring-shaped seal 38 is located in an upper portion of the passage in the housing 12 which works together with the selector shaft 36 and the upper part of the hemispherical plug 22 and is therefore adapted to the hemispherical contour of the plug 22. A second ring-shaped seal 40 is disposed to a lower portion of the passage in the housing 12 and extends outwardly a little beyond the housing 12. Outside of the housing 12, the selector shaft 36 is enclosed by a pressure ring 42 and a disk spring 44 is fitted to the selector shaft 36. An actuating lever 50 having a threaded section is connected to the selector shaft 36 by means of a nut 52 which is screwed onto the thread section of the selector shaft 36. The disk spring 42 supports a collar 46 of a hood-like section 48 of the actuating lever 50.

The hood-like section 48 has lugs 54, 56 extending downwardly therefrom and the housing 12 has two curved recesses 58, 60 defined therein in which the lugs 54, 56 are respectively inserted. This restricts the rotation of the plug 22. The plug 22 has recesses 62, 64 defined diametrically opposite therein which hold sealing elements 66, 68. The axis of each of the recesses 62, 64 is located on a radius of the hemispherical plug 22. The external contour of sealing elements 66, 68 is adapted to that of the plug 22 and when closed, as shown in FIG. 1, the sealing elements 66, 68 at the ends of connector holes 14, 16 form a seal by covering the connector holes 14, 16. The underside of each of the sealing elements 66, 68 is dome-shaped in order to allow the outer radial areas to be pushed inwards into recesses 62, 64. The sealing elements 66, 68 therefore also form springs for applying a pre-stress for the sealing effect described.

The nut 52 is used to pre-stress the selector shaft 36 and the plug 22 in order to achieve an effective seal with plug 22 in housing 12 with no dead space.

Figure 4:
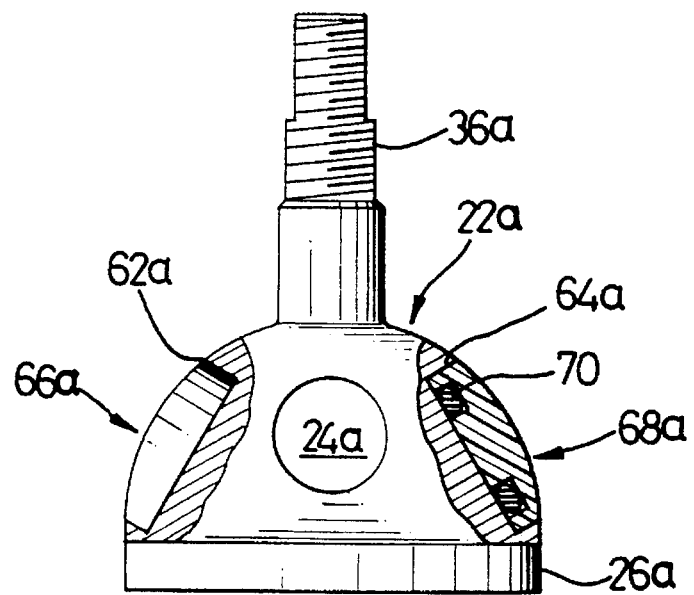
FIG. 4 is a side elevational view, partly in section, of a plug of a cock with a modified sealer insert.

The plug 22a shown in FIG. 4 is similar to the one shown in FIGS. 1 and 2. Each of the sealing elements 66a and 68a are flat-bottomed in correspondence to the base of recesses 62a and 64a and has a ring-shaped groove defined therein which contains an O ring 70 therein. Only the O ring 70 of sealing element 68a can be seen in FIG. 4. The O ring 70 acts as a spring, pre-stressing the sealing element 66a/68a in an outward direction.

The sealing elements 66 and 68 or 66a and 68a can be manufactured from a suitable material such as PTFE, PTFE compound, graphite, ceramics, metal, as well as malleable and elastic material, depending on the demands of the media and temperature.

Figure 5:
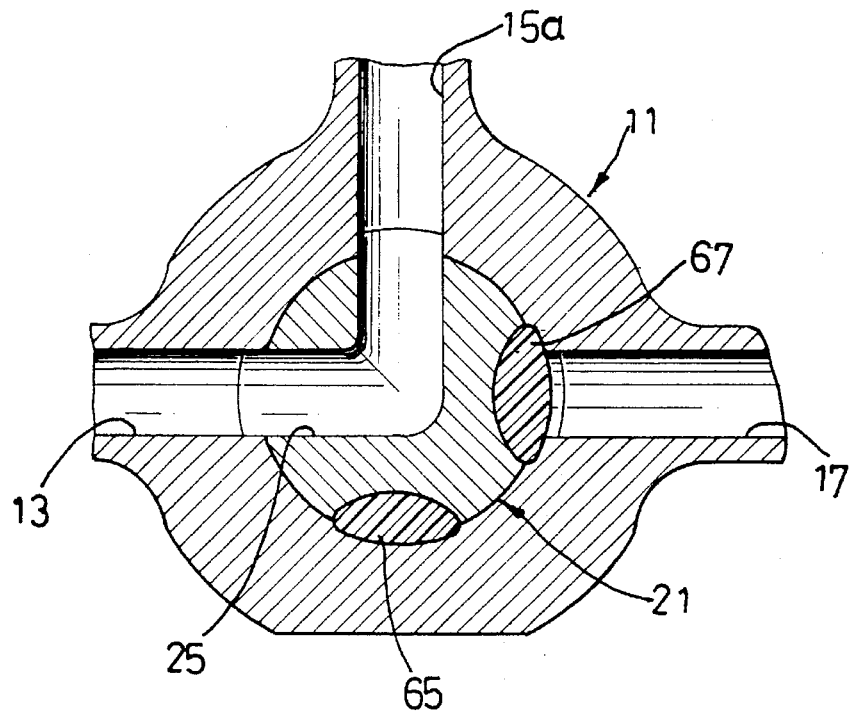
FIG. 5 is a cross sectional view of a ball valve as a three-way mounting with an L-shaped hole in the plug.

FIG. 5 shows a cross section of a ball valve housing 11 according to the invention with a hemispherical plug 21 which has an L-shaped hole 25. Accordingly, the housing 11 in addition to the connector holes 13, 17 which are arranged coaxially with each other, also has a connector hole 15a running at right angles. Two sealing elements 65, 67 are therefore offset at right angles in appropriate recesses of plug 21 in order to assure the function of the three-way valve.

Figure 6:
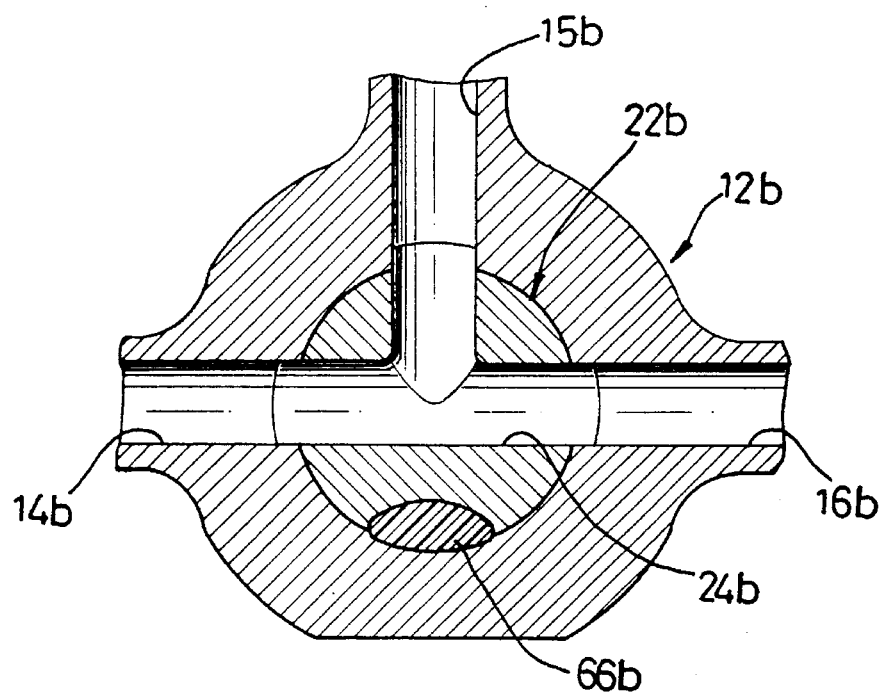
FIG. 6 is a cross sectional view similar to FIG. 5 and has a T-shaped hole in the plug.

Referring to FIG. 6, in addition to the connector holes 14b and 16b in the housing 12b, the version of the invention has a third connector hole 15b at right angles to the aligned holes 14b, 16b. The plug 22b has a T-shaped hole 24b defined therein and this is also for a three-way valve. One single sealing element 66b is fitted into an appropriate recess in hemispherical plug 22b. Otherwise the ball valves shown in FIGS. 5 and 6 function in the same way as the ball valve described above. For this reason it will not be dealt with in further detail. In addition, the hemispherical plug is similar in form to the one described above and fits into the valve housing in the same way.

Accordingly, the present invention has the following advantages:

1. The present invention eliminates the need for at least 4 flanges, screws and flange gaskets, and this means it occupies less space, saves weight and leakage through flange packings can be avoided.

2. The present invention is completely free of vacant space because the inner contour of the housing is equal in dimension to the contour of the ball and thus prevents the depositing of medium flowing therethrough.

3. Anti-stick PTFE lining, or a chrome nickel protection coat, or a wear-resistant protection coat can be applied by inner coating of the surface of the ball and the inner housing surfaces.

4. The torque is low over the entire 90 degrees switching distance and the initial breakaway torque and the running torque are equally low.

5. By unscrewing the cover the elements or parts can be easily replaced when damaged.

6. No depositing of medium occurs on the surface of the ball in the closed-position; this is achieved through the anti-stick properties of the PTFE seal.

7. The present invention is suitably operated in the field of chemical industry, foodstuff industry such as milk production company, sterilization industry, etc..

Although the invention has been explained in relation to its preferred embodiment, it is to be understood that many other possible modifications and variations can be made without departing from the spirit and scope of the invention as hereinafter claimed.

I claim:

1. A ball valve comprising a housing with connector holes defined therein, each of said connector holes having an opening to a hollow space at right angles to said connector holes, a rotating hemispherical plug placed into said hollow space above said opening and being actuated by means of a sealed selector shaft running on bearings, a cover disposed to an underside of said housing to close off said hollow space, said plug having recesses defined therein and corresponding to said connector holes, said recesses can be aligned with said holes, each of said recesses having a flat sealing element disposed therein whose external side follows a hemispherical form of said plug and under side is dome-shaped, and said sealing elements are designed to cover said connector holes when aligned accordingly.

2. The ball valve as claimed in claim 1 wherein said sealing element has an enclosing surface which is circular or polygonal.

3. The ball valve as claimed in claim 1 wherein a spring element is disposed between said sealing element and a bottom of said recess.

4. The ball valve as claimed in claim 1 wherein each of said sealing elements has a ring-shaped groove defined in an under side thereof for containing an O ring.

5. The ball valve as claimed in claim 1 wherein said selector shaft is enclosed by a sealing ring whose face is flush with the plug and the selector shaft can be pre-stressed by means of a nut supported on the housing.

6. The ball valve as claimed in claim 5 wherein a disk spring is disposed between said nut and said housing.

7. The ball valve as claimed in claim 1 wherein said plug has a cylindrical section and said housing has a cylindrical recess defined therein for said cylindrical section disposed into said cylindrical recess of said housing and said cylindrical section is flush with said cover.

8. The ball valve as claimed in claim 7 wherein a sealing ring is fitted inside said cover.

9. The ball valve as claimed in claim 7 wherein a fairlead bush, preferably made from a sealant material, is fitted on the cylindrical section.

\* \* \* \* \*